(12) United States Patent
Fuchs et al.

(10) Patent No.: US 6,308,796 B1
(45) Date of Patent: Oct. 30, 2001

(54) METHOD FOR DETERMINING AN INITIATION THRESHOLD VALUE FOR AN AUTOMATIC BRAKING PROCESS

(75) Inventors: Alexander Fuchs, Esslingen; Carsten Lauer, Stuttgart; Manfred Steiner, Winnenden; Lorenz Maack, Boeblingen; Eberhard Pfeifle, Lorch; Bernd Knoff, Esslingen; Wolfgang Kiesewetter, Waiblingen, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/188,172

(22) Filed: Nov. 9, 1998

(30) Foreign Application Priority Data

Nov. 7, 1997 (DE) .............................................. 197 49 296

(51) Int. Cl.$^7$ ....................................................... B60T 7/16

(52) U.S. Cl. .............................. 180/169; 701/79; 303/193

(58) Field of Search ................................... 180/167, 168, 180/169; 701/79, 83, 300, 301; 340/903, 436; 303/193

(56) References Cited

U.S. PATENT DOCUMENTS

| | | | |
|---|---|---|---|
| 4,053,026 | * | 10/1977 | Fujiki et al. ........................ 180/169 |
| 4,073,359 | * | 2/1978 | Fujiki et al. ........................ 180/169 |
| 4,491,840 | * | 1/1985 | Nishikawa et al. ................. 340/903 |
| 4,505,351 | * | 3/1985 | Nishikawa et al. ................. 180/169 |
| 5,158,343 | * | 10/1992 | Reichelt et al. . | |
| 5,173,859 | | 12/1992 | Deering .......................... 364/426.01 |
| 5,278,764 | * | 1/1994 | Iizuka et al. . | |
| 5,332,056 | * | 7/1994 | Niibe et al. ......................... 180/169 |
| 5,375,060 | * | 12/1994 | Nocker ............................ 180/169 X |
| 5,410,484 | * | 4/1995 | Kunimi et al. . | |

(List continued on next page.)

FOREIGN PATENT DOCUMENTS

| | | |
|---|---|---|
| 3325714 | * 1/1985 | (DE) . |
| 40 28 290 C1 | 1/1992 | (DE) . |
| 44 13 172 C1 | 3/1995 | (DE) . |
| 1 415 192 | 11/1975 | (GB) . |
| 1 546 906 | 5/1979 | (GB) . |
| 2 270 353 | 3/1994 | (GB) . |
| 2 288 446 | 10/1995 | (GB) . |
| 2 303 892 | 3/1997 | (GB) . |
| A 238 368 | 9/1993 | (JP) . |
| A 319 233 | 12/1993 | (JP) . |
| A 17 346 | 1/1995 | (JP) . |
| A 65 297 | 3/1995 | (JP) . |
| A 76-267 | 3/1995 | (JP) . |
| A 39 754 | 2/1997 | (JP) . |

OTHER PUBLICATIONS

Japanese Office Action dated Aug. 31, 1999.

Primary Examiner—Brian L. Johnson
Assistant Examiner—Bryan Fischmann
(74) Attorney, Agent, or Firm—Crowell & Moring LLP

(57) ABSTRACT

A method for determining an initiation threshold value for an automatic braking process, in which an automatic braking process is used and a brake pressure is produced which is greater than the brake pressure which corresponds to the operation of the brake pedal by the driver. Short distances between vehicles increase the risk of accidents. If a driver operates the brakes when there is a short distance between the vehicle and the preceding vehicle, in the vast majority of cases, the driver of the following vehicle is often required to perform an emergency braking due to the short distance between the vehicles. To improve the safety of vehicles, an emergency braking is performed, as quickly as possible, when the distance between vehicles is short. This emergency braking, within what is physically possible, ensures rapid deceleration of the vehicle and thus helps to avoid rear-impact accidents. While performing the automatic braking process, the method incorporates a reduction of the initiation threshold value if it is determined that the distance to a preceding vehicle is less than a predetermined limit.

28 Claims, 3 Drawing Sheets

U.S. PATENT DOCUMENTS

| | | | |
|---|---|---|---|
| 5,564,797 | 10/1996 | Steiner et al. | 303/113.4 |
| 5,574,644 * | 11/1996 | Butsuen et al. | 180/169 X |
| 5,584,542 * | 12/1996 | Klarer et al. . | |
| 5,660,448 | 8/1997 | Kiesewetter et al. | 303/155 |
| 5,669,676 * | 9/1997 | Rump et al. | 303/193 |
| 5,719,769 * | 2/1998 | Brugger et al. . | |
| 5,727,854 * | 3/1998 | Pueschel et al. . | |
| 5,952,939 * | 9/1999 | Nakazawa et al. | 340/903 |

\* cited by examiner

METHOD FOR DETERMINING AN INITIATION THRESHOLD VALUE FOR AN AUTOMATIC BRAKING PROCESS

BACKGROUND AND SUMMARY OF THE INVENTION

This application claims the priority of German application 197 49 296.7, filed Nov. 7, 1997, the disclosure of which is expressly incorporated by reference herein.

The invention relates to a method for determining an initiation threshold value for an automatic braking process.

In an automatic braking process, a brake pressure is produced which is greater than the brake pressure which corresponds to the operation of the brake pedal by the driver.

DE 40 28 290 C1 discloses an automatic braking process of this type. DE 44 13 172 C1 discloses an example of the adaptation of the initiation threshold value as a function of the driving situation disclosed in DE 40 28 290 C1.

Furthermore, it is known to use sensors in order to detect the distance between the vehicle and a preceding vehicle and, if this distance is less than a certain limit, to implement a braking process which ensures that a safe distance is maintained between the vehicle and the preceding vehicle. Such a braking process is performed by using minor decelerations (i.e., with low brake pressures). This is performed, on the one hand, for reasons of convenience to prevent undesirable severe jerking of the vehicle. On the other hand, the braking process is implemented for reasons of traffic safety, i.e., to prevent drivers who are following too closely from being surprised by a brief, abrupt deceleration of the preceding vehicle which could lead to rear-impact accidents.

Nevertheless, short distances between vehicles present a risk of major accidents. In short, if a driver operates his brakes when there is a short distance between this vehicle and the preceding vehicle, in the vast majority of cases, the driver of the vehicle is often required to perform an emergency braking procedure due to the short distance between the vehicles.

It is therefore an object of the invention to improve the safety of vehicles by implementing an emergency braking procedure, as quickly as possible, when the distances between vehicles are short. This emergency braking process, within what is physically possible, ensures a rapid deceleration of the rear vehicle and thus helps to avoid rear-impact collision accidents.

This and other objects and advantages are achieved by the method according to the invention, in which during the automatic braking process, a brake pressure is produced which is greater than the brake pressure that corresponds to the actual position of the brake pedal. In essence, the automatic braking process is initiated whenever the rate of operation of the brake pedal exceeds an initiation threshold value. If the distance to the preceding vehicle is less than a predetermined limit, the distance to the preceding vehicle is detected and the initiation threshold value of the automatic braking process is reduced.

In an advantageous manner, this ensures that a safe and quick change of the initiation threshold value of the automatic braking process occurs if the driver operates the brake pedal during an emergency. As a further consequence, a brake pressure is produced which is greater than the brake pressure that corresponds to the actual position of the brake pedal.

In accordance with another objective of the invention, if the distance to the preceding vehicle is less than another predetermined limit value, an automatic braking process is performed, which is independent of the operation of the brake pedal by the driver. Here, the braking process is performed in an advantageous manner such that at least one wheel of the vehicle reaches the locking limit. In this case, the automatic braking process is advantageously terminated if either the distance to the preceding vehicle exceeds a predetermined value (due, for example, to the vehicle becoming stationary), or it is determined that the driver has released the brakes.

Other objects, advantages and novel features of the present invention will become apparent from the following detailed description of the invention when considered in conjunction with the accompanying drawings.

DETAILED DESCRIPTION OF THE DRAWINGS

Figure 1:
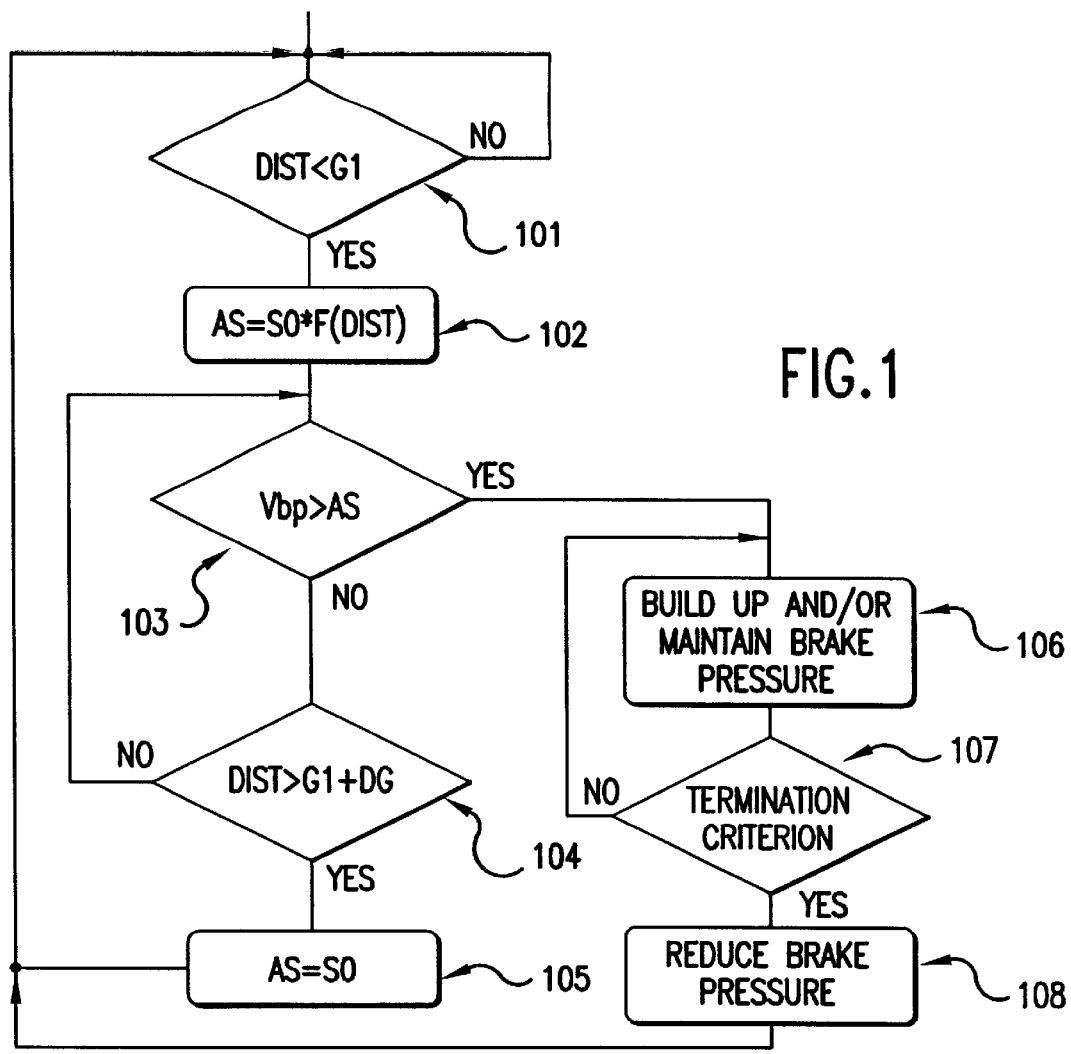
FIG. 1 shows the flowchart of a first method according to the invention.

FIG. 1 shows the flowchart of a first method according to the invention. In the case of this method, a check is performed (according to step 101) to determine whether the distance Dist to the preceding vehicle is less than the limit value G1. Here, the limit value G1 is determined at least as a function of the speed of the vehicle. The determination of a limit value G1 for the distance to the preceding vehicle as a function of the vehicle speed and, possibly, of other factors, is known from the distance control devices initially mentioned (i.e., sensors). As an example, the limit value G1 is determined, according to the equation $$G1 = K1 \cdot v \cdot \left(1 + K2 \frac{(v\_\text{relative})^2}{Dist}\right)$$

from the distance Dist, the speed v of the vehicle, the relative speed v_relative of the vehicle with respect to the preceding vehicle, and the predetermined constants K1 and K2. In particular, the limit value G1 may be the threshold value which, if not exceeded, results in control of the vehicle distance. Additionally, the coefficient of friction $\mu$ between the wheel and the roadway can be taken into account during the determination of the limit value G1, i.e., the constant K1 is predetermined as a function of the coefficient of friction $\mu$, for example. The coefficient of friction $\mu$ can be particularly determined. Specifically, if the distance Dist is in the region of possible values of the limit value G1, an automatic braking process which is undetectable by vehicle occupants is performed. Here, the coefficient of friction $\mu$ is then determined from the speed of the wheels using known prior art methods.

If the limit value G1 is exceeded, then step 101 is performed once again. If, in contrast, it is found that the limit value G1 has not been exceeded, then (according to step 102) the initiation threshold value AS of the automatic braking process is determined by multiplying an initial initiation threshold value S0 by a factor F(Dist). The factor F(Dist) is, in this case, for example, determined on the basis of one of the curves described in FIG. 2. Here, the initial initiation threshold value S0 can be a permanently predetermined value or a value determined as a function of various factors (as is evident, for example, from the initially cited prior art).

A check is then performed (according to step 103) to determine whether the rate of operation Vbp of the brake pedal by the driver exceeds the initiation threshold value AS. If this is not the case, then a check is performed (according to step 104) to determine whether the distance Dist to the preceding vehicle is greater than the sum of limit value G1 and the predetermined amount DG. The predetermined amount DG is in this case, for example, in a range from 10% to 20% of the limit value G1. Further, DG is predetermined as an independent, fixed value or a speed-dependent value. Due to the fact that a greater value for the distance Dist to the preceding vehicle is required to reset the initiation threshold value AS, hysteresis is achieved which prevents rapidly successively varying fluctuation of the initiation threshold value AS.

If it is found in the step 104 that the distance Dist to the preceding vehicle is greater than the sum of the limit value G1 and the predetermined amount DG, the initiation threshold value AS is reset (in step 105) to the initial initiation threshold value S0. If the initial threshold value S0 is not a fixed parameter but a variable parameter, then it is worthwhile to perform a new determination of the initial initiation threshold value S0. Hence, a return to step 101 occurs. If, in contrast, it is found in step 103 that the rate of operation Vbp of the brake pedal exceeds the initiation threshold value AS, then (according to step 106) a brake pressure is produced which is greater than the brake pressure that corresponds to the actual position of the brake pedal.

A check is subsequently performed in step 107 to determine whether the termination criterion for the automatic braking process is satisfied. Here, the termination criteria for the automatic braking process may be performed in a manner known from the prior art which relates to the automatic braking process initially described. Furthermore, the vehicle may become stationary or the driver may operate the brake pedal in a manner which corresponds to releasing the brakes. If the termination criterion is not satisfied, then a return to step 106 occurs, and the brake pressure is again increased or is maintained in an unchanged state. Otherwise, according to step 108, the brake pressure is reduced, i.e., reduced to the brake pressure which corresponds to the actual position of the brake pedal. A return to step 101 then occurs.

Figure 2:
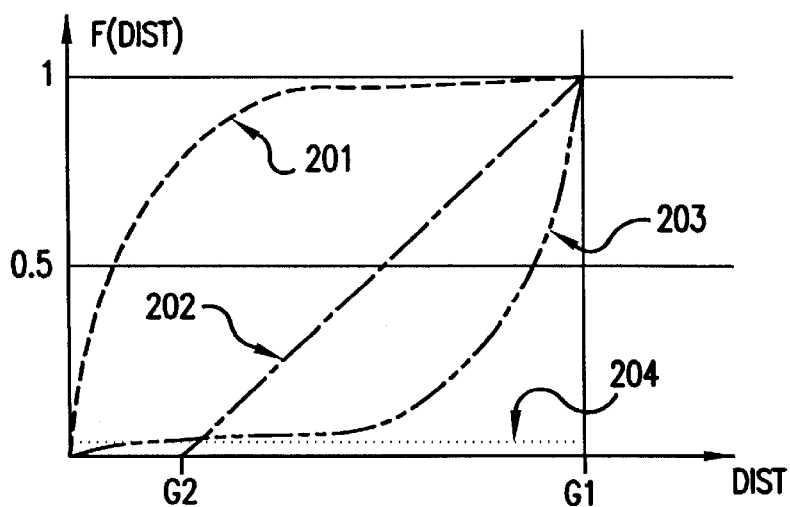
FIG. 2 shows various characteristics for determining the initiation threshold value as a function of the distance to the preceding vehicle.

FIG. 2 shows various examples of curves for the factor F(Dist) which are used to determine the initiation threshold value as a function of the distance Dist. The choice of the curve for the factor F(Dist) is in this case dependent, inter alia, on the choice of the limit value G1. If a relatively high limit value G1 is chosen, then only a slight tendency to change the initiation threshold value AS occurs. If, in contrast, a relatively low limit value G1 is chosen, then (at least initially) the initiation threshold value AS is severely reduced. Overall, the choice of the curve must also be matched to the behavior and the characteristics of the vehicle.

According to the curve 201, the factor in a first region is approximately 1. As a result, initially, no major change in the initiation threshold value occurs. Only when the distance Dist is reduced further does any reduction occur in the factor. Here, the initiation threshold value AS becomes reduced to approximately 0 at very short distances. The curve 202 comprises a linear reduction in the factor F(Dist) in the region between the limit value G1 and a second limit value G2. At the second limit value G2, the factor F(Dist) reaches 0. As a result, any operation of the brake pedal leads to an initiation of the automatic braking process. This corresponds to the knowledge that, if the distance between two vehicles is less than the second threshold value G2, any braking process represents emergency braking. This is based on the existence of a considerable risk of an accident due to the short distance in conjunction with the relative speed (which is not zero) between the vehicles. Curve 203 also corresponds to a short distance between vehicles. Here, the progressive reduction in the factor F(Dist) and thus the reduction of the initiation threshold value AS is considerably sharper, when the limit value G1 has not been exceeded. Curve 204 corresponds to an immediate reduction in the factor F(Dist) to very low values, if the limit value G1 is not exceeded. The value of F(Dist), in this case, is chosen such that virtually any operation of the brake pedal leads to an initiation of the automatic braking process.

Figure 3:
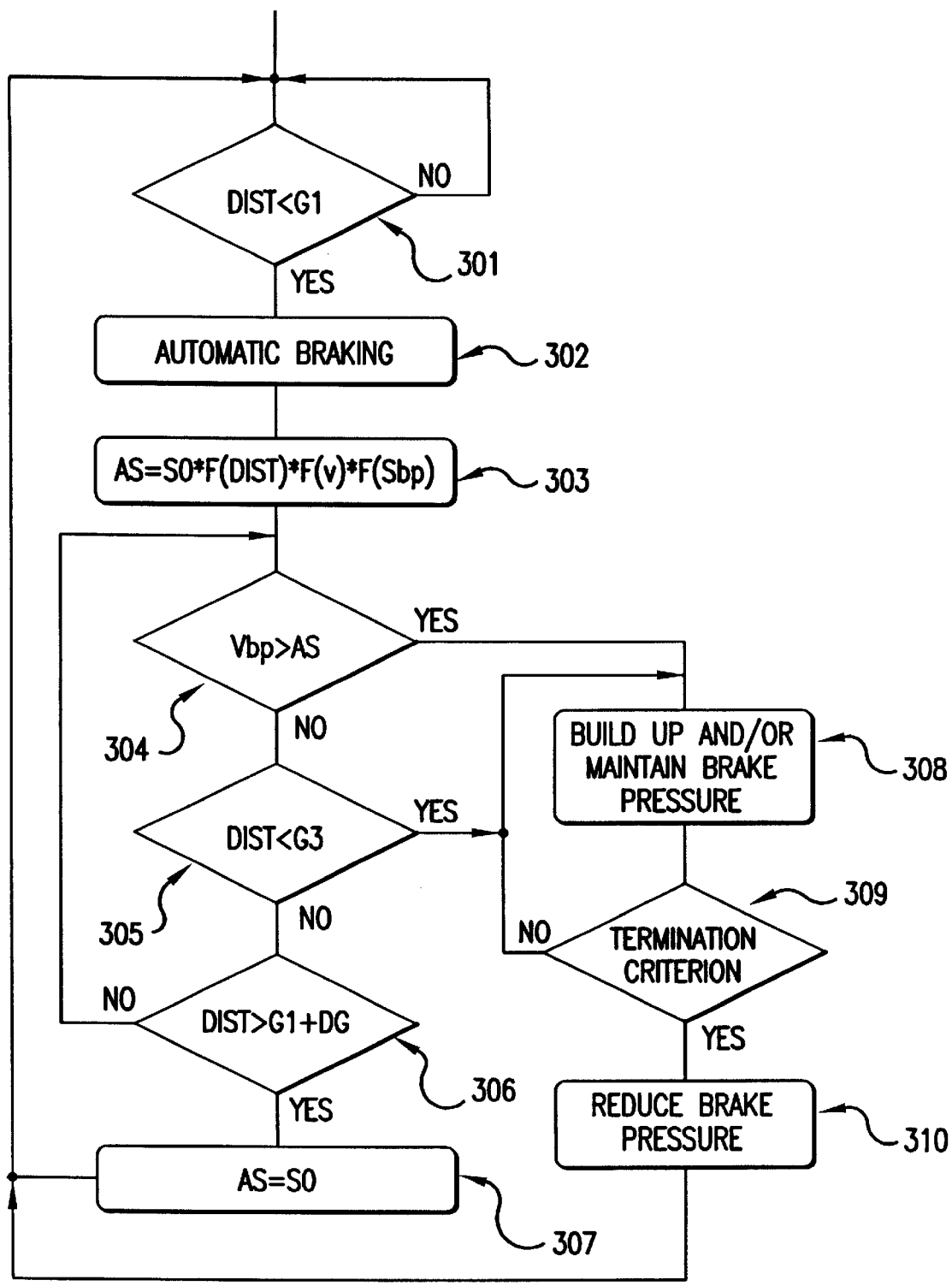
FIG. 3 shows the flowchart of a second method according to the invention.

FIG. 3 shows the flowchart of a further method according to the invention. The underlying principle of the method sequence in this case corresponds essentially to the method according to FIG. 1. In step 301, a check is performed to determine whether the distance (Dist) to a preceding vehicle is less than the limit value G1. If this is not the case, then a return to step 301 occurs. Otherwise, an automatic brake operation is performed (according to step 302), during which a brake pressure is produced in the wheel brakes such that the speed of the vehicle is matched to that of the preceding vehicle. Such braking processes are known from the prior art.

Figure 4:
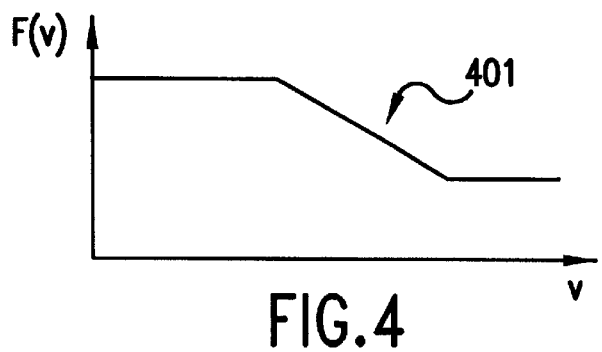
FIG. 4 shows a characteristic for influencing the initiation threshold value as a function of speed.

According to step 303, the initiation threshold value AS is then determined using three factors which are multiplied by the initial threshold value S0. Here, the first factor F(Dist) represents the matching of the initiation threshold value AS to the distance Dist to the preceding vehicle, and is described in FIG. 2. The vehicle-speed-dependent factor F(v) expresses the fact that, if the distance between two vehicles is the same but the vehicle speeds are different, the situation of emergency braking is more probable if the vehicle speed is greater. One example of a speed-dependent factor F(v) is shown in FIG. 4.

A further factor is the factor F(Sbp), which represents an influence of the initiation threshold value as a function of the position of the pedal movement of the brake pedal. This factor is necessary particularly if the position of the brake pedal changes, due to automatic braking of the vehicle occurring before the driver starts to operate the brake pedal, or if the force-movement characteristic of the brake pedal is changed for this reason. In this case, it is known to vary the initiation threshold value during automatic braking processes as a function of the pedal movement which has already occurred. However, a changed characteristic may be necessary during the performance of an automatic braking process. If necessary, a corresponding match of the curve to the particular situation must also be performed. The plot of the curve is shown, for example, in FIG. 5. However, the curve depends on the design characteristics of the vehicle and must he matched in an appropriate manner to these characteristics of the vehicle.

A check is next performed (according to step 304) to examine whether the rate of operation Vbp of the brake pedal exceeds the initiation threshold value AS. If this is true, a jump to step 308 occurs. If this is not the case, a check is performed (according to step 305) to determine whether the distance Dist to the preceding vehicle is less than the third limit value G3. If this is the case, then the short distance between the two vehicles is solely used to decide that an emergency situation exists, and a branch to step 308 occurs. Here, the third limit value G3 may be, for example, one quarter of the limit value G1 from which automatic braking of the vehicle is performed. If not, a check is performed (according to step 306) to determine whether the distance Dist to the preceding vehicle is greater than the limit value G1 by a specific amount DG. If this is not true, a return to step 304 occurs. Otherwise, according to step 307, the threshold value is reset to the initial threshold value and a return to step 301 occurs.

According to step 308, a brake pressure is developed which is greater than the brake pressure which corresponds to the actual position of the brake pedal. In particular, the brake pressure can (in this case) be increased until the vehicle's antilock braking system causes the brake pressure to be controlled on at least one wheel. In step 309, a check is then performed to determine whether a termination criterion is satisfied for the automatic braking process. If so, according to step 310, the brake pressure is then reduced until it reaches the level which corresponds to the actual position of the brake pedal. Otherwise, a return to step 308 occurs, and the brake pressure is again developed or maintained. In addition to the criteria quoted in FIG. 1, the distance to the preceding vehicle can also be used as a termination criterion. This is particularly useful if the criterion in step 305 has been satisfied and a jump has occurred to step 308 for this reason. Thus, for example, satisfaction of the criterion in step 306, or non-satisfaction of the criterion in step 301, can lead to the automatic braking process being terminated.

FIG. 4 shows an example of a curve for the factor F(v) as a function of the vehicle speed. At low vehicle speeds v, F(v) is large, i.e., the initiation threshold value is not reduced or is reduced only to a minor extent. In a second speed range, the value of the factor F(v) is progressively reduced as the vehicle speed increases. As a result, as the vehicle speed rise, the initiation of the automatic braking process occurs earlier. In a third region, the factor F(v) subsequently has a constant low value.

Figure 5:
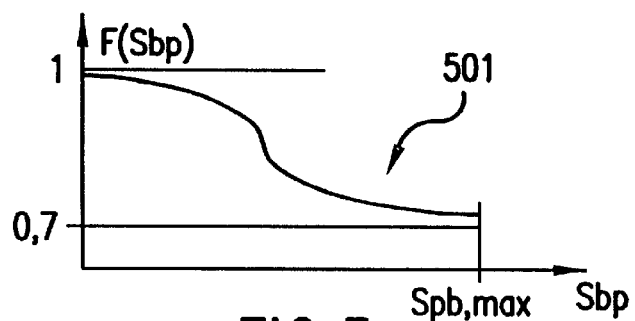
FIG. 5 shows a characteristic for influencing the initiation threshold value as a function of pedal movement.

FIG. 5 shows an example of a curve for the factor F(Sbp) as a function of the pedal movement before the start of the automatic braking process. For small pedal movements Sbp of the brake pedal, the factor is approximately equal to 1, i.e., the initiation threshold value is not reduced or is reduced only to a minor extent. Subsequently, the value of the factor F(Sbp) is reduced as the vehicle speed rises. As a result, the initiation threshold value of the automatic braking process is reduced as the pedal movement increases, such that it has a constant, low value in a third region (for example, 70% of the initial value).

The shape of the curve is governed by the rate of pedal operation that can be achieved by the driver. As the pedal movement becomes greater, an increasing pedal operation force is required in order to achieve a constant rate of pedal operation. Once he has already started a large pedal movement, a driver will therefore only achieve lower rates of operation of the brake pedal. As a result, the initiation threshold value must be correspondingly reduced. In this case, the shape of the curve is dependent on the design characteristics of the vehicle, and must be adapted in a corresponding manner.

Figure 6:
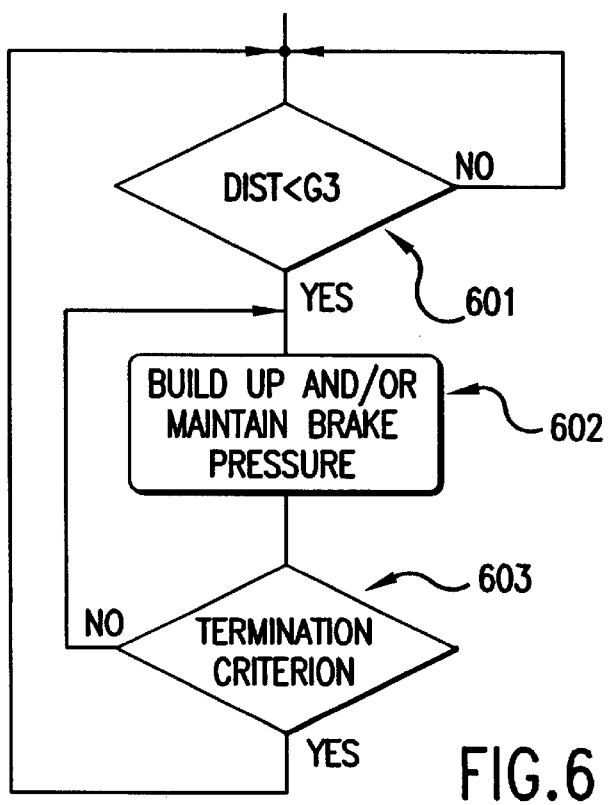
FIG. 6 shows the flowchart of a third method according to the invention.

FIG. 6 shows the flowchart of a further method according to the invention. According to step 601, a check is performed to determine whether the distance to the preceding vehicle is less than a limit value G3. If this is not the case, a branch to step 601 occurs. However, if this is the case, the automatic braking process is performed in accordance with step 602. In addition, a brake pressure is produced which is greater than the brake pressure which corresponds to the actual position of the accelerator pedal. This occurs independently of the operation of the brake pedal by the driver. In particular, the brake pressure is chosen, in this case, such that the locking limit is reached on at least one wheel of the vehicle. This is confirmed by the control action of an antilock braking system.

Here, the braking process is performed until (according to step 603) a termination criterion is satisfied and a return to step 601 occurs. The possible termination criteria have, in this case, already been described by example in the previous method (i.e., in step 310 of the method according to FIG. 3) so that reference is made to the previous reference.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An automatic braking process, comprising:
   initiating the automatic braking process whenever a rate of operation of the brake pedal exceeds an initiation threshold value to produce a first brake pressure which is greater than a second brake pressure which corresponds to a position of a brake pedal;
   detecting a distance to a preceding vehicle; and reducing an initiation threshold value to initiate the automatic braking process if the distance to the preceding vehicle is less than a first limit value.

2. The method according to claim 1, further comprising the step of:
   performing the automatic braking process in order to match the distance and a speed of a following vehicle to the preceding vehicle, if the distance to the preceding vehicle is less than the first limit value.

3. The method according to claim 2, wherein the initiation threshold value is predetermined by a driver as a function of the position of the brake pedal at a start of the operation of the brake pedal, and the position of the brake pedal at the start of the operation of the brake by the driver is dependent upon the automatic braking process.

4. The method according to claim 1, wherein the initiation threshold value for the automatic braking process is determined as a function of a speed of the vehicle.

5. The method according to claim 2, wherein the initiation threshold value for the automatic braking process is determined as a function of the speed of the vehicle.

6. The method according to claim 3, wherein the initiation threshold value for the automatic braking process is determined as a function of the speed of the vehicle.

7. The method according to claim 1, wherein the initiation threshold value is reduced so that each operation of the brake pedal by a driver produces the initiation of the automatic braking process.

8. The method according to claim 2, wherein the initiation threshold value is reduced until each operation of the brake pedal by a driver produces the initiation of the automatic braking process.

9. The method according to claim 3, wherein the initiation threshold value is reduced until each operation of the brake pedal by the driver produces the initiation of the automatic braking process.

10. The method according to claim 1, wherein if the first limit value is not exceeded, the initiation threshold value is progressively reduced as the distance to the preceding vehicle decreases.

11. The method according to claim 2, wherein if the first limit value is not exceeded, the initiation threshold value is progressively reduced as the distance to the preceding vehicle decreases.

12. The method according to claim 3, wherein if the first limit value is not exceeded, the initiation threshold value is progressively reduced as the distance to the preceding vehicle decreases.

13. The method according to claim 10, further comprising the step of:
    setting the initiation threshold value between the first limit value and a second limit value;
    wherein, at the second limit value, any brake operation by the driver initiates the automatic braking process.

14. The method according to claim 11, further comprising the step of:
    setting the initiation threshold value between the first limit value and a second limit value;
    wherein, at the second limit value, any brake operation by the driver initiates the automatic braking process.

15. The method according to claim 12, further comprising the step of:
    setting the initiation threshold value between the first limit value and a second limit value;
    wherein, at the second limit value, any brake operation by the driver initiates the automatic braking process.

16. The method according to claim 1, further comprising the step of:
    resetting the initiation threshold value to a previous value when the limit value is not exceeded, only if the distance to the preceding vehicle exceeds the first limit value by a predetermined amount.

17. The method according to claim 2, further comprising the step of:
    resetting the initiation threshold value to a previous value when the limit value is not exceeded, only if the distance to the preceding vehicle exceeds the first limit value by a predetermined amount.

18. The method according to claim 3, further comprising the step of:
    resetting the initiation threshold value to a previous value when the limit value is not exceeded, only if the distance to the preceding vehicle exceeds the first limit value by a predetermined amount.

19. The method according to claim 1, further comprising the step of:
    predetermining a third limit value;
    wherein if the distance to the preceding vehicle is less than the third limit value, the automatic braking process is performed independently of the operation of the brake pedal by a driver.

20. The method according to claim 2, further comprising the step of:
    predetermining a third limit value;
    wherein if the distance to the preceding vehicle is less than the third limit value, the automatic braking process is performed independently of the operation of the brake pedal by a driver.

21. The method according to claim 3, further comprising the step of:
    predetermining a third limit value;
    wherein if the distance to the preceding vehicle is less than the third limit value, the automatic braking process is performed independently of the operation of the brake pedal by the driver.

22. The method according to claim 1, wherein during the automatic braking process, a control limit of an antilock braking system is reached at a maximum rate on at least a plurality of wheels of a vehicle.

23. The method according to claim 22, wherein the automatic braking process is terminated if the vehicle becomes stationary.

24. The method according to claim 1, wherein the automatic braking process is terminated if the distance to the preceding vehicle is greater than a predetermined value.

25. The method according to claim 1, wherein the automatic braking process is terminated if a driver has released the brake pedal.

26. The method according to claim 1, wherein the automatic braking process is terminated if a vehicle becomes stationary.

27. The method according to claim 1, further comprising the step of:
    predetermining the limit value as a function of a coefficient of friction between a wheel and a road;
    wherein the coefficient of friction is determined during a brake operation.

28. The method according to claim 27, wherein if the distance to the preceding vehicle is in a region of possible values of the limit value, undetectable brake operations are automatically performed during driving in order to determine the coefficient of friction.

* * * * *